United States Patent [19]

Dolman et al.

[11] 4,430,756
[45] Feb. 7, 1984

[54] OSCILLATOR CONTROL CIRCUIT

[75] Inventors: Rodney A. Dolman, Lynchburg; Gregory N. Mears, Forest, both of Va.

[73] Assignee: General Electric Company, Lynchburg, Va.

[21] Appl. No.: 350,981

[22] Filed: Feb. 22, 1982

[51] Int. Cl.³ .......................... H04B 1/44; H04B 1/50
[52] U.S. Cl. .......................................... 455/78; 455/87
[58] Field of Search ....................... 455/78, 79, 86, 87, 455/82, 83

[56] References Cited

U.S. PATENT DOCUMENTS

| | | | |
|---|---|---|---|
| 3,153,194 | 10/1964 | Orwin | 455/87 |
| 3,300,720 | 1/1967 | Kowols | 455/86 |
| 4,095,183 | 6/1978 | Kakigi | 455/78 |

FOREIGN PATENT DOCUMENTS

| | | |
|---|---|---|
| 613217 | 11/1948 | United Kingdom . |
| 1439895 | 6/1976 | United Kingdom . |
| 1518831 | 7/1978 | United Kingdom . |
| 1520442 | 8/1978 | United Kingdom . |

*Primary Examiner*—Marc E. Bookbinder
*Attorney, Agent, or Firm*—James J. Williams

[57] ABSTRACT

An oscillator is controlled so that it produces the correct frequency in the transmitting condition, and so that it produces a slightly different frequency in the receiving condition. This is achieved by a circuit which supplies a first control voltage to the oscillator for transmitting and which supplies a second and different control voltage to the oscillator for receiving. This second and different control voltage causes the oscillator frequency in the receiving condition to be different so that there is no interference to or improper operation of a repeater system. The circuit also prevents any modulation signals from reaching the oscillator in the receiving condition, thus preventing false signals or other problems.

2 Claims, 3 Drawing Figures

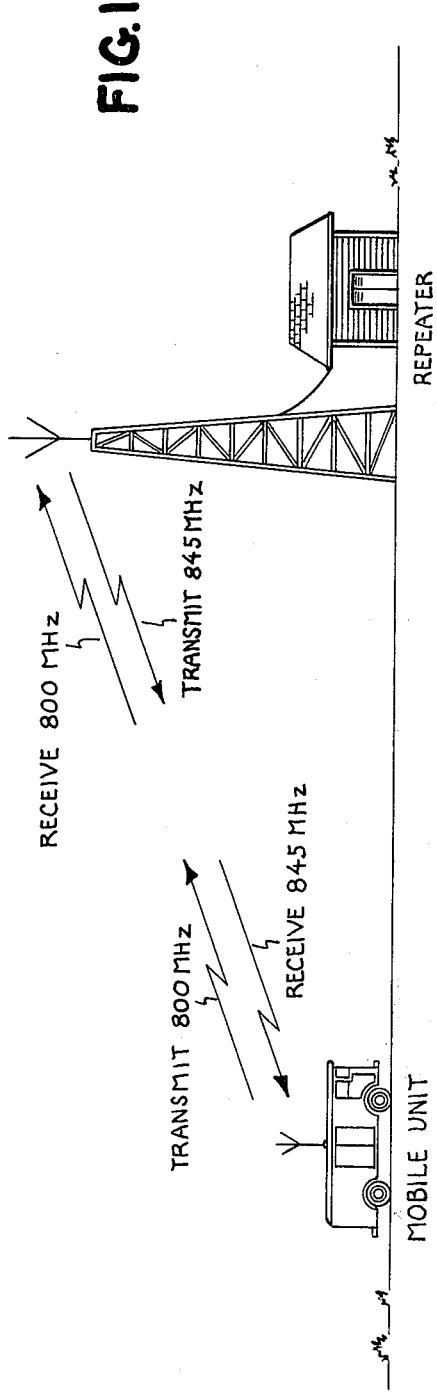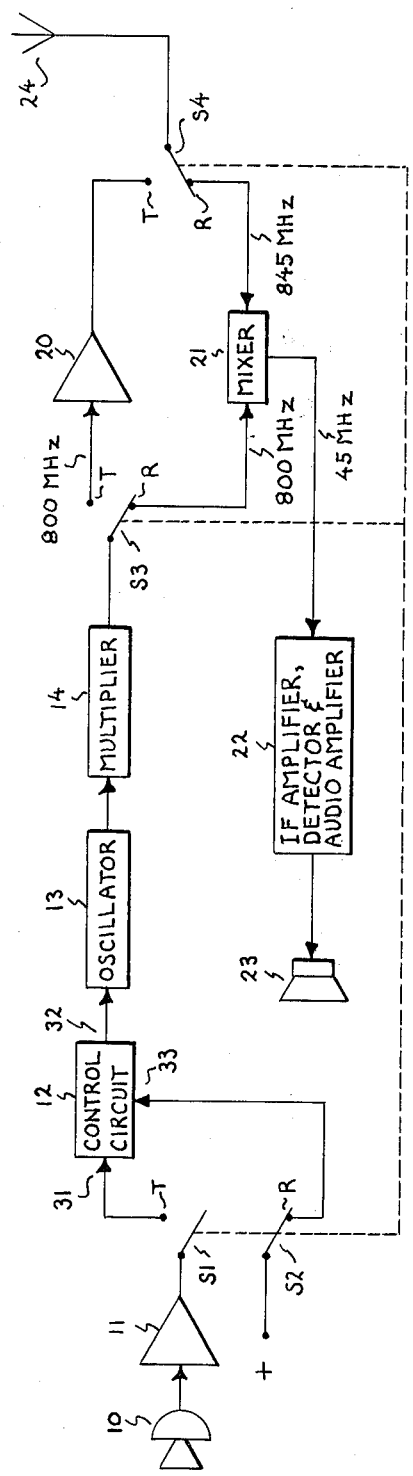
FIG.1
FIG.2

OSCILLATOR CONTROL CIRCUIT

BACKGROUND OF THE INVENTION

Our invention relates to an oscillator control circuit, and particularly to a circuit for controlling the frequency of a single oscillator that supplies signals to a radio transmitter and to a radio receiver that operate with a radio repeater or similar installation.

In some radio communication systems, a station will transmit on a first frequency and receive on a second frequency. Thus, for example, a mobile radio station on a vehicle might transmit to a base station or repeater on a frequency of 800 MHz and receive on a frequency of 845 MHz. The repeater of course would receive on the frequency of 800 MHz and transmit on the frequency of 845 MHz. In the interests of economy and simplification, the mobile station preferably would have only one stable oscillator which produces a 800 MHz signal for transmitting, and which mixes or heterodynes the 800 MHz signal with the received 845 MHz signal to produce an intermediate frequency of 45 MHz which is detected for utilization. However, in the receiving condition, some amount of the 800 MHz oscillator signal is radiated, so that if the mobile station is close to the base station or repeater, this 800 MHz signal will capture or control the repeater even though the mobile station does not to intend to do so. This of course prevents other mobile stations from using the repeater on that frequency or channel.

In addition, the single oscillator must not or should not be modulated in the receiving condition, as such modulation causes noise or other problems in the receiving condition, and may cause false alerting in a tone controlled system.

SUMMARY OF THE INVENTION

Our invention provides an improved arrangement for controlling an oscillator so that it produces the correct frequency in the transmitting condition, and so that it produces a slightly different frequency in the receiving condition. This is achieved by a circuit which supplies a first control voltage for transmitting and which supplies a second and different control voltage for receiving. This second and different control voltage causes the oscillator frequency in the receiving condition to be different so that there is no interference to or improper operation of a repeater system. Our arrangement also prevents any modulation signals from reaching the oscillator in the receiving condition, thus preventing false signals or other problems.

BRIEF DESCRIPTION OF THE DRAWING

The subject matter which we regard as our invention is particularly pointed out and distinctly claimed in the claims. The structure and operation of our invention, as well as advantages, may be better understood from the following description given in connection with the accompanying drawing in which:

FIG. 1 shows a pictorial view of a communication or repeater system which can utilize our invention;

FIG. 2 shows a block diagram of a radio transmitter and receiver utilizing our improved oscillator control circuit.

DESCRIPTION OF THE PREFERRED EMBODIMENT

Figure 3:
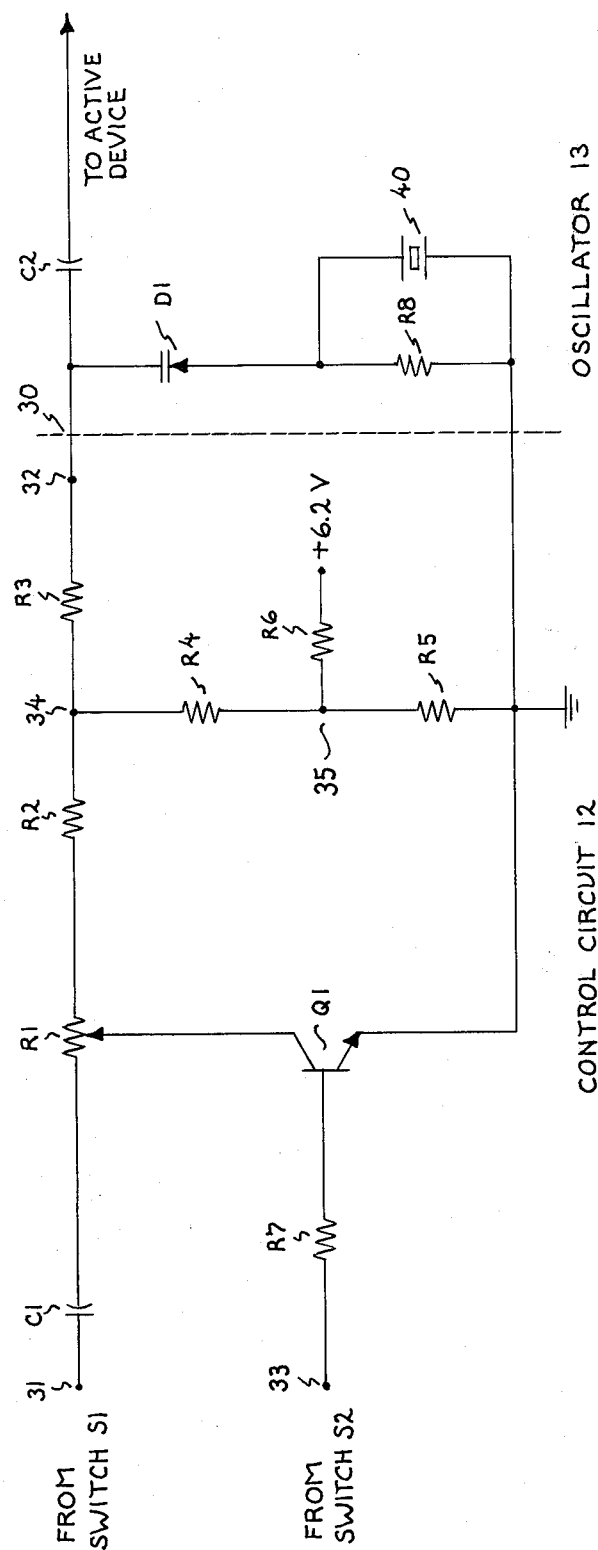
FIG. 3 shows a schematic diagram of a preferred embodiment of our improved oscillator control circuit.

FIG. 1 shows a pictorial view of a radio repeater or communications system with which our invention is advantageously used. Persons skilled in the art will appreciate, of course, that our invention can also be used in other radio systems or arrangements. In such a system, a base station or repeater provides radio communications to and from a number of vehicular or mobile units. Such a system may have a number of spaced channels. As shown by way of example for one such channel, the repeater transmits on a frequency of 845 MHz to the mobile unit. The mobile unit transmits on a frequency of 800 MHz to the repeater. If the mobile unit has a single stable oscillator of 800 MHz, even though the mobile unit is in the receive condition, this 800 MHz signal may, when the mobile unit is close to the repeater, capture or lock up the repeater. As a result, the channel can not be used by any other mobile unit, and is wasted. At the very least, this is an undesirable condition.

To overcome this problem, we provide an improved control circuit that changes the frequency of the stable oscillator slightly from its nominal or normal transmitting frequency (800 MHz in the example) so that in the receiving condition, the repeater is not captured by any radiated signal. With reference to FIG. 2, our control circuit is represented by a block 12. Input or information signals to be transmitted are supplied by a microphone 10 and amplified if need be by an amplifier 11. The output of the amplifier 11 is connected to a switch S1 (which may be a solid state device) for selective application to our control circuit 12 when the switch S1 is actuated for transmitting. Our control circuit 12 is controlled by a switch S2 which is supplied by a suitable source of positive direct current voltage when the switch S2 is unactuated for receiving. The output of our circuit 12 is connected to a voltage controlled crystal oscillator 13. The output of the oscillator 13 may, if desirable or necessary, be applied to a multiplier 14 which multiplies the fundamental oscillator frequency up to the desired frequency, which in the assumed example is 800 MHz. Subsequently, when reference is made to the oscillator frequency, that frequency may be the actual oscillator frequency multiplied to a higher frequency. The output of the multiplier 14 is applied to a switch S3 which has an unactuated or receive terminal R and an actuated or transmit terminal T. The transmit terminal T of the switch S3 is connected to a suitable filter and power amplifier 20 whose output is connected to a transmit terminal T of a switch S4. The switch S4 is connected to the antenna 24 of the mobile unit. The receive terminal R of the switch S3 and the receive terminal R of the switch S4 are connected to the inputs of a mixer 21 which produces the difference of the frequency supplied by the oscillator 10 and the frequency of the received signal. Thus, for the assumed example, the oscillator frequency of 800 MHz and the received frequency of 845 MHz produces an intermediate frequency of 45 MHz. This intermediate frequency is amplified and detected in the block 22 and audio or other output signals supplied to a loud speaker 23. As indicated by the dashed line, the switches S1, S2, S3, S4 may be actuated at the same time, such as by a push-to-talk button. When so actuated, the switches are moved from their lower position (as shown) to their upper position.

For the switch condition shown in FIG. 2, the 800 MHz oscillator signal can be radiated, even though the mobile unit is in the receive condition. This radiation can cause capture or control of a repeater or other station, even though such capture or control is undesired and not intended.

In accordance with our invention, our oscillator control circuit 12 provides a control voltage which has one magnitude or level for the transmitting condition, and a second and different magnitude or level for the receiving condition. A preferred schematic diagram of our control circuit 12 is shown to the left of the dashed line 30 in FIG. 3. A schematic diagram of a frequency controlling circuit for the oscillator 13 is shown to the right of the dashed line 30. Our circuit includes an information input terminal 31 for connection to the switch S1. Signals at this terminal 31 are applied through a direct current isolating capacitor C1, a variable resistor R1, a first resistor R2 and a second resistor R3 which is connected to an output terminal 32 of our circuit 12. The adjustable arm or tap of the variable resistor R1 is connected to the collector of an NPN transistor Q1 whose emitter is connected to ground or a reference voltage. The base of the transistor Q1 is connected through a resistor R7 to a control terminal 33 for connection to the receive contact R of the switch S2. A voltage divider comprised of two resistors R6, R5 is provided between a positive direct current voltage of 6.2 volts and ground or a reference voltage. The junction 35 of the voltage divider resistors R6, R5 is connected through a resistor R4 to the junction 34 of the resistors R2, R3.

With respect to the oscillator 13, we have assumed that the frequency controlling elements comprise a crystal 40, a resistor R8, and a voltage variable capacitor diode D1. This frequency control portion is connected through a capacitor C2 to the active or regenerative portion of the oscillator 13. This active portion has not been shown, since persons skilled in the art will appreciate the many forms such a circuit may take. As known in the art, the capacity presented by the diode D1 determines the frequency of the oscillator 13. This capacity is in turn controlled by the direct current voltage at the output terminal 32. As this voltage increases, the capacity decreases and the oscillator frequency increases. As this voltage decreases the capacity increases and the oscillator frequency decreases.

To explain the operation of our control circuit 12, we have first assumed that the mobile unit of FIG. 2 is in the receive condition. In this condition, a positive voltage is supplied by the contact R of the switch S2 to turn the transistor Q1 on. This produces two results: First, it grounds or shunts any modulating signals which may appear at the terminal 31, so that these signals do not reach and modulate or vary the oscillator 13. Second, it causes the transistor Q1 to place the resistors R4, R2, and a portion of the resistor R1 in parallel with the voltage divider resistor R5. This reduces the positive voltage (produced by the voltage divider resistors R6, R5) present at the terminal 32 from 4.4 volts for example to 3.8 volts for example. This reduced voltage of 3.8 volts increases the diode D1 capacity, which in turn causes the oscillator 13 to reduce its frequency to 799.9875 MHz for example. If this frequency of 799.9875 MHz is radiated, it is sufficiently removed from the repeater receive frequency of 800 MHz so that the repeater is not controlled or captured. (This frequency of 799.9875 MHz does of course require a slightly different intermediate frequency, namely 45.0125 MHz.)

Second we have assumed that the mobile unit of FIG. 2 is placed in the transmit condition. This causes the switch S1 to connect the microphone 10 and the amplifier 11 to the terminal 31 of our circuit 12 for modulating the oscillator 13. The switch S2 removes the voltage from the base of the transistor Q1 so that the transistor Q1 is turned off and these modulating signals can pass from the terminal 31 to the terminal 32. In addition, this removes the voltage dropping path of the resistors R4, R2 and a portion of R1 from the junction 35, so that the voltage at the terminal 32 rises from the previously assumed value of 3.8 volts to the higher value established by voltage divider R6, R5, which was assumed to be 4.4 volts. This higher voltage decreases the diode D1 capacity, which in turn causes the oscillator 13 to produce the desired transmitting frequency of 800 MHz.

It will thus be seen that we have provided a new and improved arrangement for controlling the frequency of a single, stable oscillator which is used in a radio station, particularly a mobile station which may undesirably capture or control a repeater station. Our circuit or control arrangement is relatively simple, and provides the desired change in oscillator frequency, and also prevents any modulating signal from being applied to the oscillator in the receive condition. While we have shown only one embodiment of our control circuit 12, persons skilled in the art will appreciate that the control circuit 12 may take many forms. For example, switching means could be provided to simply switch the voltage at the junction 35 between two fixed voltages provided by separate sources. Also, the direction of the voltage change between the transmit and receive conditions may be reversed from the direction described in our preferred embodiment. Likewise, the direction of the frequency change in response to a given direction of voltage change may also be reversed from our preferred embodiment. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved radio transceiver comprising:
   a. a radio transmitter for transmitting on a frequency F1 to a remote station;
   b. a radio receiver for receiving on a frequency F2 from said remote station, said radio receiver having a mixer circuit for producing an intermediate frequency substantially equal to the difference between said frequency F1 and said frequency F2;
   an oscillator having a control input and an output for producing said frequency F1 in response to a transmitting control signal applied to said control input, and for producing a mixer frequency that differs from said frequency F2 by an amount substantially equal to said intermediate frequency but that differs from said frequency F1 by an amount sufficient to avoid capture of said remote station by radiation from said radio receiver in response to a receiving control signal applied to said control input;
   d. means for selectively coupling said oscillator output to said radio transmitter or to said mixer circuit of said radio receiver;
   e. control means having a control input and an output;

f. and means coupling said control means output to said oscillator control input for selectively applying either said transmitting control signal or said receiving control signal to said oscillator control input in response to transmit or receive command signals applied to said control input of said control means.

2. The improved radio transceiver of claim 1 wherein said control means further comprise: an information input for supplying modulating signals to said oscillator, and means coupled to said information input for preventing signals at said information input from reaching and modulating said oscillator in response to a receive command signal applied to said control input of said control means.

* * * * *